United States Patent [19]

Thulin

[11] Patent Number: 5,328,656
[45] Date of Patent: Jul. 12, 1994

[54] METHOD FOR VACUUM MOLDING OF LARGE OBJECTS OF SYNTHETIC RESIN

[76] Inventor: Dag Thulin, 19, avenue Hoche, F-75008 Paris, France

[21] Appl. No.: 952,842

[22] PCT Filed: Dec. 12, 1991

[86] PCT No.: PCT/SE91/00390
 § 371 Date: Dec. 2, 1992
 § 102(e) Date: Dec. 2, 1992

[87] PCT Pub. No.: WO91/18725
 PCT Pub. Date: Dec. 12, 1991

[30] Foreign Application Priority Data
 Jun. 8, 1990 [SE] Sweden .................... 9002066

[51] Int. Cl.⁵ ............... B29C 39/00; B28B 5/00
[52] U.S. Cl. .................... 264/571; 264/102; 264/240; 264/241; 264/259; 264/328.8; 264/328.11; 264/328.12; 264/331.11
[58] Field of Search ........... 264/404, 236, 240, 328.8, 264/328.11, 331.11, 510, 247, 102, DIG. 78, 571, 241, 259, 328.12, 328.2

[56] References Cited

U.S. PATENT DOCUMENTS 3,579,738 5/1971 Beattie ................... 18/26

FOREIGN PATENT DOCUMENTS 0382536 8/1990 European Pat. Off. .
1432333 4/1976 United Kingdom .

Primary Examiner—Jan H. Silbaugh
Assistant Examiner—Christopher A. Fiorilla
Attorney, Agent, or Firm—Pollock, Vande Sande & Priddy

[57] ABSTRACT

A method for vacuum molding of large objects in a dismountable mold. The method includes the steps of introducing a monomer and a hardening agent to a cavity within a mold, with the cavity being under a vacuum. The monomer and hardening agent are introduced at least at one position in the cavity. The position being situated initially in the lower portion of the cavity. The position is successively moved upward at such a speed that the position is located just below the surface of the monomer and hardening agent as they are introduced into the cavity and their level rises within the cavity.

15 Claims, 1 Drawing Sheet

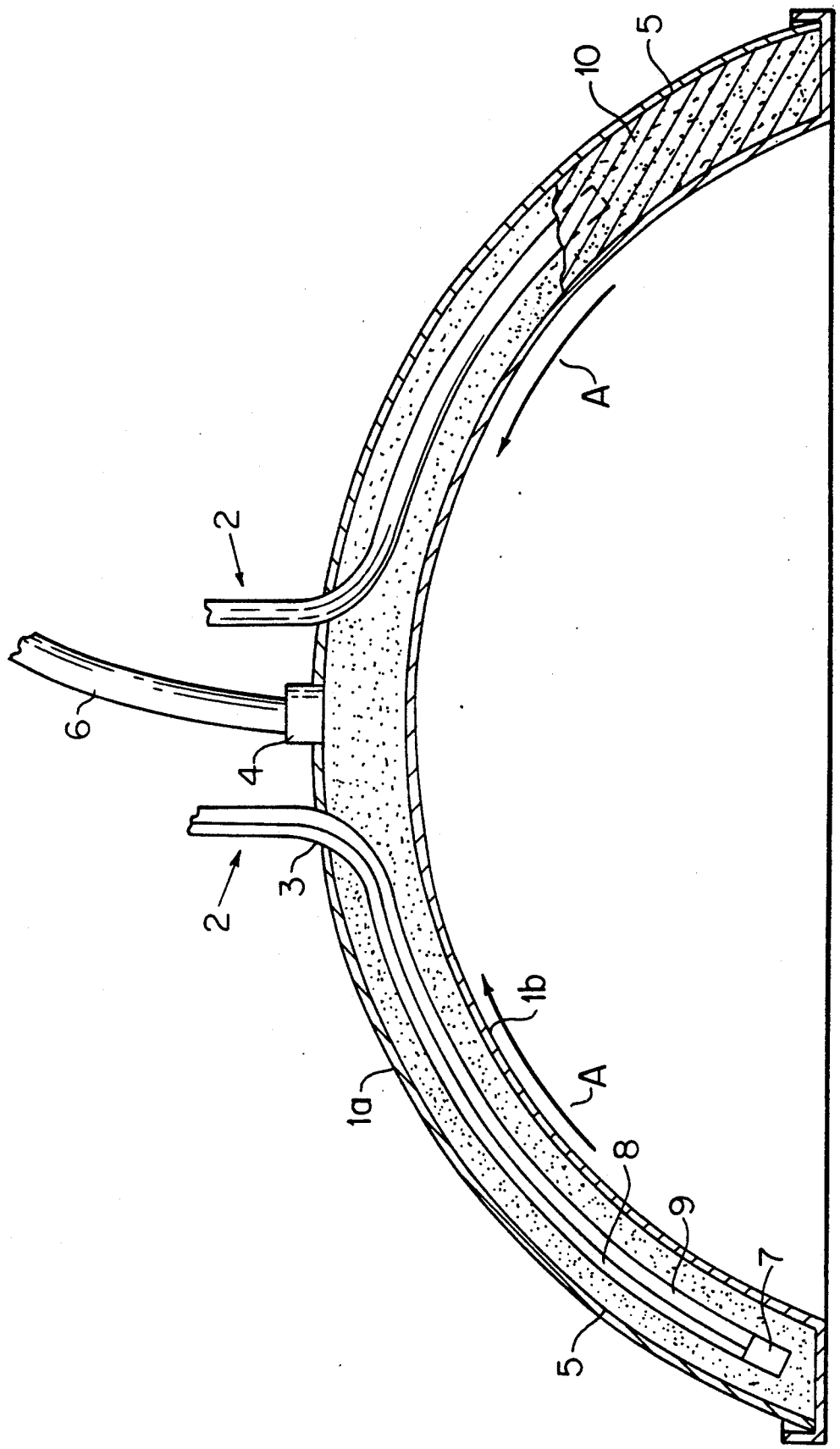

METHOD FOR VACUUM MOLDING OF LARGE OBJECTS OF SYNTHETIC RESIN

FIELD OF THE INVENTION

The present invention relates to a method for vacuum molding of large objects of synthetic resin in a dismountable mold with reinforcing materials placed in the same mold. Monomer with hardening agent and possible accelerator are supplied to the cavity of the mold from below and upwards for filling the cavity held under a vacuum.

BACKGROUND OF THE INVENTION

In vacuum molding of objects of synthetic resin, a dismountable mold is used with reinforcing materials placed in the mold. The vacuum molding is effected in such a way that a vacuum is applied to the cavity through one or several connections arranged at the upper portion of the mold. Ready-mixed synthetic resin in the form of monomer and hardening agent are fed into the lower portion of the mold. The synthetic resin rises in the mold by way of the applied vacuum.

The first synthetic resin supplied rises until it reaches the uppermost part of the mold. When large objects are manufactured, the rising of the resin takes a long time. During this time the synthetic resin will become viscous, producing lumps and plugs of synthetic resin in the cavity, preventing the continued rising of the synthetic resin in the cavity. Thus, it is difficult to manufacture large, particularly shell-like objects, with little thickness relative to the surface area, such as domes, boat hulls, or car bodies, with vacuum molding.

Known methods for vacuum molding avoid the above-mentioned problems by using only small amounts of hardening agent in the monomer and subsequent heating of the mold after the mold has been filled with synthetic resin for hardening. However, this method is circumstantial and difficult to carry out when large objects of synthetic resin shall be vacuum molded.

One of the great advantages of vacuum molding is that it is not harmful to the environment, since no emission of monomer to the atmosphere takes place. An other advantage is that the molding is effected in one single working step, whereby the manufactured object becomes totally homogeneous and free from voids due to the vacuum applied.

SUMMARY OF THE INVENTION

The object of the invention is to provide a method for vacuum molding, which makes it possible to manufacture large objects of synthetic resin without the above-mentioned disadvantages. This is achieved according to the invention mainly in that the synthetic resin is supplied at least at one position in the cavity initially in the lower portion of the cavity and is then successively moved upwards at such a speed that the position is located just below the surface of the synthetic resin as it is supplied and rises in the mold.

In a preferred embodiment according to the invention, the synthetic resin is supplied through at least one hose, which is sealingly inserted through a wall in the upper portion of the mold sufficiently deep into the cavity so that its free end is positioned in the lower portion of the cavity. The hose or hoses are the progressively pulled upwards at such a speed that the free end or ends of the hose or hoses are positioned just below the surface of the synthetic resin as it is supplied and rises in the mold.

With the method according to the invention, domes, boat hulls, flagstaffs, and special types of pipes with a smooth surface, for instance may be manufactured.

BRIEF DESCRIPTION OF THE DRAWINGS

A non-limiting example of the invention will now be described with reference to the accompanying drawing, in which a sectional view of a mold for effecting the method for vacuum molding according to the invention is shown for manufacturing a half-spherical dome. The left side of the drawing illustrates the position of the hose in an initial stage and its right side illustrates the hose partly pulled up and the mold partly filled with synthetic resin.

DETAILED DESCRIPTION OF THE PREFERRED EMBODIMENTS

The method according to the invention is applicable to different types of known apparatuses for vacuum molding, and will be described below in connection with a mold 1 chosen as an example. The mold is dismountable in its lower portion and is composed of two complementary mold parts 1a, 1b. At least one synthetic resin supply hose 2 is sealingly inserted through the wall of preferably the upper mold part 1a in its uppermost portion through any type of sealing 3. At least one connection 4 for the application of vacuum is provided in the upper portion of the mold 1. As seen in the drawing, the connection is provided in the wall of the upper mold part 1a for applying a vacuum to the interior of the mold 1. The vacuum connection 4 is connected to one end of a suction pipe 6. The other end of the suction pipe is connected to a vacuum apparatus (not shown), such as a vacuum pump, which is adapted to provide vacuum in the mold. In the case of a vacuum pump, its outlet is connected to suitable filters and separation apparatuses for monomer (not shown), so that no emission to the atmosphere occurs.

In the following way an object of synthetic resin is manufactured in a mold of this type by the method according to the invention. With the mold parts 1a, 1b separated from each other, the surfaces of the mold directed towards the cavity are coated with release agent and, if desired, afterwards with a surface layer, for instance of gel coat, depending upon which type of surface the object to be manufactured is to have. Then, the desired amount and type of reinforcing material 5 is placed in the mold in the form of one or more self-supporting or spray applied fiber layers or the like on one or both mold parts. The reinforcing material 5 can for instance be glass fiber, carbon fiber, or kevlar, among others. The amount of reinforcing material is preferably such that the object of synthetic resin to be manufactured will contain 20–80% by weight of reinforcing material.

When bringing together the mold parts 1a, 1b for closing the mold 1, the hose or hoses 2 are inserted through the sealings 3 and placed with their free ends quite close to the bottom of the cavity. The vacuum apparatus is then connected through the suction pipe 6 to the vacuum connection 4 thereby providing an underatmospheric pressure or vacuum in the mold 1. This vacuum must not be too large, since the mold 1 then must have a very heavy structure for avoiding deformation of the mold. The monomer, with added hardening agent and the possible accelerator is introduced, preferably through pumping, through the hose or hoses 2 into the cavity. Alternatively, the adding of the hardening agent can be made at the free end of the hose 2, which then is provided with two channels 8, 9 and a mixing nozzle 7 at the free end, as shown to the left in the drawing. A certain period of time after the beginning of the introduction of the synthetic resin, and when the lower portion of the cavity has been filled to such an extent that the free end of the hose or hoses 2 is positioned just below the surface of the synthetic resin, a successive pulling out of the hose (5) of the mold 1 is started at such a speed that the free ends of the nose (5) during the whole vacuum molding remain positioned just below the surface of the synthetic resin.

The vacuum applied to the cavity shall be maintained during the whole vacuum molding.

Since the mold 1 is filled with synthetic resin from the bottom and upwards, as shown in the drawing by arrow A, while the hoses 2 are successively pulled out, it does not matter if the synthetic resin begins to cure at the bottom of said mold 1.

Even if the synthetic resin can be sucked into the mold 1 by the vacuum applied to the cavity, it is preferred, in order to avoid making the hoses 2 too coarse in order not to collapse, to supply the synthetic resin by pumping. When producing shell-like objects the hoses 2 have preferably flattened cross section with a width amounting to 60-20%, preferably 40-30%, of the width of the cavity.

The synthetic resin introduced into the cavity can be mixed with chopped reinforcing material of the same kind as the reinforcement 5 for reinforcing the channels, which possibly may be formed in the reinforcing material, when the hoses are pulled out of the mold. The number of hoses needed depends upon the viscosity of the monomer, the amount of reinforcing material in the cavity and the dimension of the hoses 2, which in turn is depending upon the width of the cavity.

By the method according to the invention, homogeneous objects of synthetic resin free from voids are obtained. Also, rapidly, as well as slowly, curing synthetic resins can be used, while the emission of monomer to the atmosphere is minimized.

Although the invention has be described above with reference to a mold of half-spherical shape, it is obvious to the artisan that a mold of any suitable shape can be used. Also, while hoses are used for supplying the synthetic resin into the mold it is obvious that other means can be used. For instance, a number of closeable inlet openings, placed horizontally along the mold and at different heights may be used for filling the mold.

I claim:
1. A method for vacuum molding of large objects of synthetic resin in a dismountable mold, said method comprising the steps of:
   introducing a synthetic resin made up of a monomer and a hardening agent into a cavity within a dismountable mold, said cavity being under a vacuum, wherein said monomer and hardening agent are introduced into the cavity in at least at one position, said at least one position situated initially in a lower portion of said cavity; and
   successively moving said at least one position upward at such a speed that said at least one position is located just below a surface of said monomer and hardening agent as they are introduced into said cavity and their level rises within said cavity.

2. The method according to claim 1, further comprising introducing reinforcing materials into the cavity prior to introducing said monomer and said hardening agent.

3. The method according to claim 1, further comprising introducing an accelerator into said cavity simultaneously with introducing said monomer and said hardening agent.

4. The method according to claim 1, further comprising the steps of:
   introducing said synthetic resin by supplying said synthetic resin into said cavity through at least one hose sealingly inserted through a wall in an upper portion of the mold, said hose being inserted at a sufficient depth within said cavity such that a free end of said at least one hose is positioned in the lower portion of said cavity; and
   progressively pulling up said at least one hose with a speed such that said free end of said at least one hose is positioned just below the surface of said monomer and said hardening agent as they are supplied and rise in the cavity.

5. The method according to claim 4, wherein said vacuum molding is composed of large members with a small thickness relative to surface area, and said at least one hose has a flattened cross section with a width 20-60% of the width of said cavity.

6. The method according to claim 5, wherein said at least one hose is provided with two channels for monomer and hardening agent respectively, and said monomer and said hardening agent are mixed continuously with each other at the free end of said hose.

7. The method according to claim 4, wherein said vacuum molding is composed of large members with a small thickness relative to surface area, and said at least one hose has a flattened cross section with a width 30-40% of the width of said cavity.

8. The method according to claim 4, wherein said at least one hose is provided with two channels for monomer and hardening agent respectively, and wherein said monomer and said hardening agent are mixed continuously with each other at the free end of said hose.

9. The method according to claim 4, wherein the monomer and the hardening agent are supplied by pumping.

10. The method according to claim 4, wherein the monomer is mixed with chopped reinforcing material prior to its introduction into said cavity.

11. The method according to claim 1, wherein the monomer and the hardening agent are supplied by pumping.

12. The method according to claim 11, wherein said vacuum molding is composed of large members with a small thickness relative to surface area, and said at least one hose has a flattened cross section with a width 20-60% of the width of said cavity.

13. The method according to claim 1, wherein the monomer is mixed with chopped reinforcing material prior to its introduction into said cavity.

14. The method according to claim 13, wherein said vacuum molding is of large objects with a small thickness relative to surface area, and said at least one hose has a flattened cross section with a width 20-60% of the width of said cavity.

15. The method according to claim 13, wherein said vacuum molding is of large objects with a small thickness relative to surface area, and said at least one hose has a flattened cross section with a width 30-40% of the width of said cavity.

* * * * *